(12) United States Patent
Smith et al.

(10) Patent No.: US 9,829,112 B2
(45) Date of Patent: Nov. 28, 2017

(54) DIAPHRAGM VALVE WITH DUAL POINT SEAL AND FLOATING DIAPHRAGM WEB

(71) Applicant: Parker-Hannifin Corporation, Cleveland, OH (US)

(72) Inventors: Zachary Spencer Smith, Tucson, AZ (US); Darren Edward Conner, Tucson, AZ (US)

(73) Assignee: Parker-Hannifin Corporation, Cleveland, OH (US)

( * ) Notice: Subject to any disclaimer, the term of this patent is extended or adjusted under 35 U.S.C. 154(b) by 4 days.

(21) Appl. No.: 14/762,009

(22) PCT Filed: Feb. 21, 2014

(86) PCT No.: PCT/US2014/017597
§ 371 (c)(1),
(2) Date: Jul. 20, 2015

(87) PCT Pub. No.: WO2014/133887
PCT Pub. Date: Sep. 4, 2014

(65) Prior Publication Data
US 2015/0369379 A1 Dec. 24, 2015

Related U.S. Application Data

(60) Provisional application No. 61/769,467, filed on Feb. 26, 2013, provisional application No. 61/769,519, filed on Feb. 26, 2013.

(51) Int. Cl.
*F16K 1/36* (2006.01)
*F16K 41/10* (2006.01)
(Continued)

(52) U.S. Cl.
CPC ............... *F16K 1/36* (2013.01); *F16K 1/34* (2013.01); *F16K 31/126* (2013.01);
(Continued)

(58) Field of Classification Search
CPC ...... F16K 1/34; F16K 1/36; F16K 1/38; F16K 7/12; F16K 7/14; F16K 7/17; F16K 31/126; F16K 41/103; Y10T 137/7781
(Continued)

(56) References Cited

U.S. PATENT DOCUMENTS 4,044,998 A 8/1977 Giese
5,002,086 A 3/1991 Linder et al.
(Continued)

FOREIGN PATENT DOCUMENTS

DE 10146462 A1 * 4/2003 ........... F16K 41/103
EP 0780611 A1 6/1997
(Continued)

OTHER PUBLICATIONS

International Search report and Written Opinion for corresponding International Application No. PCT/US2014/017597, dated Jun. 2, 2014.

(Continued)

*Primary Examiner* — Mary McManmon
*Assistant Examiner* — Richard K Durden
(74) *Attorney, Agent, or Firm* — Renner, Otto, Boisselle & Sklar, LLP

(57) ABSTRACT

A high purity valve (10) includes a valve body (12) having an inlet (40) and an outlet (42) separated by a valve seat (32), and a diaphragm (22) having a central stem (23) that has a first end coupled to a piston (20) for actuating the valve, and a poppet (28) for engaging the valve seat to close the valve. The poppet forms a dual point seal (50/52, 50'/52') with the valve seat having at least two points of contact between an annular surface (30) of the poppet and the valve seat. The annular surface of the poppet may be either a concave surface or a convex surface that provides the dual point seal. The valve has a retainer (14) adjacent the diaphragm, and the (Continued)

diaphragm has a flexible web (26) that extends radially outward from the central stem. The retainer has a surface (60) adjacent the web, and the surface is spaced apart from the web such that the web does not contact the surface when the valve is pressurized.

9 Claims, 6 Drawing Sheets

(51) Int. Cl.
*F16K 1/34* (2006.01)
*F16K 31/126* (2006.01)
*F16K 1/38* (2006.01)
*F16K 7/17* (2006.01)

(52) U.S. Cl.
CPC .............. *F16K 41/103* (2013.01); *F16K 1/38* (2013.01); *F16K 7/17* (2013.01); *Y10T 137/7781* (2015.04)

(58) Field of Classification Search
USPC .................. 137/494; 251/331, 333, 334, 366
See application file for complete search history.

(56) References Cited

U.S. PATENT DOCUMENTS

| | | | |
|---|---|---|---|
| 5,152,500 A | 10/1992 | Hoobyar et al. | |
| RE34,261 E | 5/1993 | Sule | |
| 5,217,043 A * | 6/1993 | Novakovic | F16K 31/3855 137/460 |
| 6,056,003 A | 5/2000 | Madsen et al. | |
| 6,123,320 A | 9/2000 | Rasanow et al. | |
| 6,394,417 B1 | 5/2002 | Browne et al. | |
| 7,063,304 B2 | 6/2006 | Leys | |
| 7,100,894 B2 | 9/2006 | Newberg | |
| 7,357,368 B2 * | 4/2008 | Takeda | F16K 31/143 251/331 |
| 7,537,194 B2 * | 5/2009 | Nagai | F16K 1/38 251/122 |
| 8,141,585 B2 | 3/2012 | Tschurtz | |
| 2005/0253100 A1 * | 11/2005 | Yasue | F16K 1/523 251/63 |
| 2006/0016494 A1 * | 1/2006 | Irwin | F16K 7/17 137/625.28 |
| 2006/0118752 A1 | 6/2006 | Tin-Kai et al. | |
| 2006/0145106 A1 | 7/2006 | Takeda et al. | |
| 2008/0001110 A1 | 1/2008 | Nagai | |
| 2008/0279706 A1 * | 11/2008 | Gambier | F04B 49/243 417/455 |
| 2009/0314979 A1 * | 12/2009 | McIntire | F04B 53/102 251/334 |
| 2010/0012868 A1 * | 1/2010 | Lodolo | F16K 31/385 251/25 |
| 2013/0020521 A1 * | 1/2013 | Byrne | F16K 1/385 251/334 |
| 2013/0119289 A1 | 5/2013 | Morris et al. | |
| 2013/0119290 A1 * | 5/2013 | Takeda | F16K 7/14 251/333 |
| 2015/0323081 A1 * | 11/2015 | Hasunuma | F16K 1/24 251/331 |

FOREIGN PATENT DOCUMENTS

| | | |
|---|---|---|
| EP | 1323964 A2 | 7/2003 |
| EP | 1640649 A1 | 3/2006 |
| EP | 1520130 B1 | 4/2009 |
| TW | 201144641 A | 12/2011 |
| TW | 201243192 A | 11/2012 |
| WO | 00/60258 A1 | 10/2000 |
| WO | 2005/015066 A1 | 2/2005 |
| WO | WO 2005012066 A1 | 2/2005 |
| WO | 2012/118071 A1 | 9/2012 |

OTHER PUBLICATIONS

Preliminary Report on Patentability for corresponding International Application No. PCT/US2014/017597, dated Jun. 2, 2015.
Examination Report for corresponding European Application No. 14709086.4, dated Nov. 14, 2016.
Examination Report for corresponding European Patent Application 14709086.4 dated Jun. 26, 2017.

* cited by examiner

DIAPHRAGM VALVE WITH DUAL POINT SEAL AND FLOATING DIAPHRAGM WEB

RELATED APPLICATIONS

This application is a national phase of International Application No. PCT/Us2014/017597 filed Feb. 21, 2014 and published in the English language.

This application claims the benefit of U.S. Provisional Application Nos. 61/769,467 and 61/769,519, both filed on Feb. 26, 2013, which are incorporated herein by reference.

FIELD OF INVENTION

The present application relates generally to diaphragm valves, and more particularly, to fluoropolymer valves for use in high purity systems, such as semiconductor manufacturing or other corrosive or high purity applications.

BACKGROUND

Various high purity systems, such as systems for manufacturing pharmaceuticals, semiconductors, and the like, use high purity diaphragm valves, such as valves made from fluoropolymers. Typical high purity valves have a valve body with an inlet and an outlet separated by a valve seat and a diaphragm. The diaphragm typically has a central stem for sealing against the valve seat to open and close the valve, and an outwardly extending web that seals the cavity of the valve. One existing valve for such a system includes a tongue and groove seal that acts against the valve seat. This tongue and groove design can produce too many particles for a dynamic seal, and therefore is best suited for static sealing applications.

For high purity systems, it is important for the valve diaphragm to maintain a proper seal against the valve seat. In addition, through the numerous cycles of operation, valve seat wear can occur, which reduces the efficacy of the seal. The lack of an effective seal can reduce valve performance in conventional configurations.

In addition, in some circumstances it may be desirable to reduce the thickness of the diaphragm web to increase the valve stroke. A thin diaphragm web, however, is likely to balloon when the valve is pressurized. Some conventional valves incorporate a support structure for reinforcing the diaphragm web as it balloons under pressure. The support structure can be contoured to approximately match the contour of the ballooned diaphragm web, and as the diaphragm web balloons under increased pressure, more of the diaphragm can be pressed into contact with the support surface. The point of contact with the support structure can create an undesirable concentration of stress in the web, which among other drawbacks, may adversely affect the cycle life of the valve.

SUMMARY OF INVENTION

In view of the deficiencies of conventional high purity diaphragm valves, a need exists in the art for an improved diaphragm valve having enhanced valve life, reliability, and performance. The present invention is a high purity valve having enhanced valve life and performance due to a configuration that significantly improves sealing by the diaphragm against the valve seat, and has a diaphragm web configuration by which the diaphragm will exhibit minimal surface stress without constraint or support from a retainer or body. The diaphragm forms a dual point seal against the valve seat for enhanced sealing, and the diaphragm web balloons outward to a natural position without contacting a valve retainer.

A high purity valve includes a valve body having an inlet and an outlet separated by a valve seat, and a diaphragm having a central stem that has a first end coupled to a piston for actuating the valve, and a second end that is a poppet for engaging the valve seat to close the valve. The poppet forms a dual point seal with the valve seat having at least two points of contact between an annular surface of the poppet and the valve seat. The dual point seal may be configured as concentric annular seals when the annular surface of the poppet is pressed against the valve seat. The annular surface of the poppet may be either a concave surface or a convex surface that provides the dual point seal.

The valve further may include a retainer positioned adjacent the diaphragm, and the diaphragm has a web that extends radially outward from the central stem. The retainer has a surface adjacent the web, and the surface of the retainer is spaced apart from the web such that the web does not contact the surface of the retainer when the valve is pressurized. The web is a flexible web that balloons outwardly in the direction of the retainer to a natural position when the valve is pressurized, thereby minimizing concentrations of stresses on the web.

The valve further includes a housing enclosing an interior portion of the valve, wherein the housing is coupled to the valve body in a manner that seals the interior portion of the valve with an outer portion of the diaphragm. The housing may be coupled to the retainer and the valve body, and the housing compresses an outer portion of the diaphragm between the valve body and the retainer.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
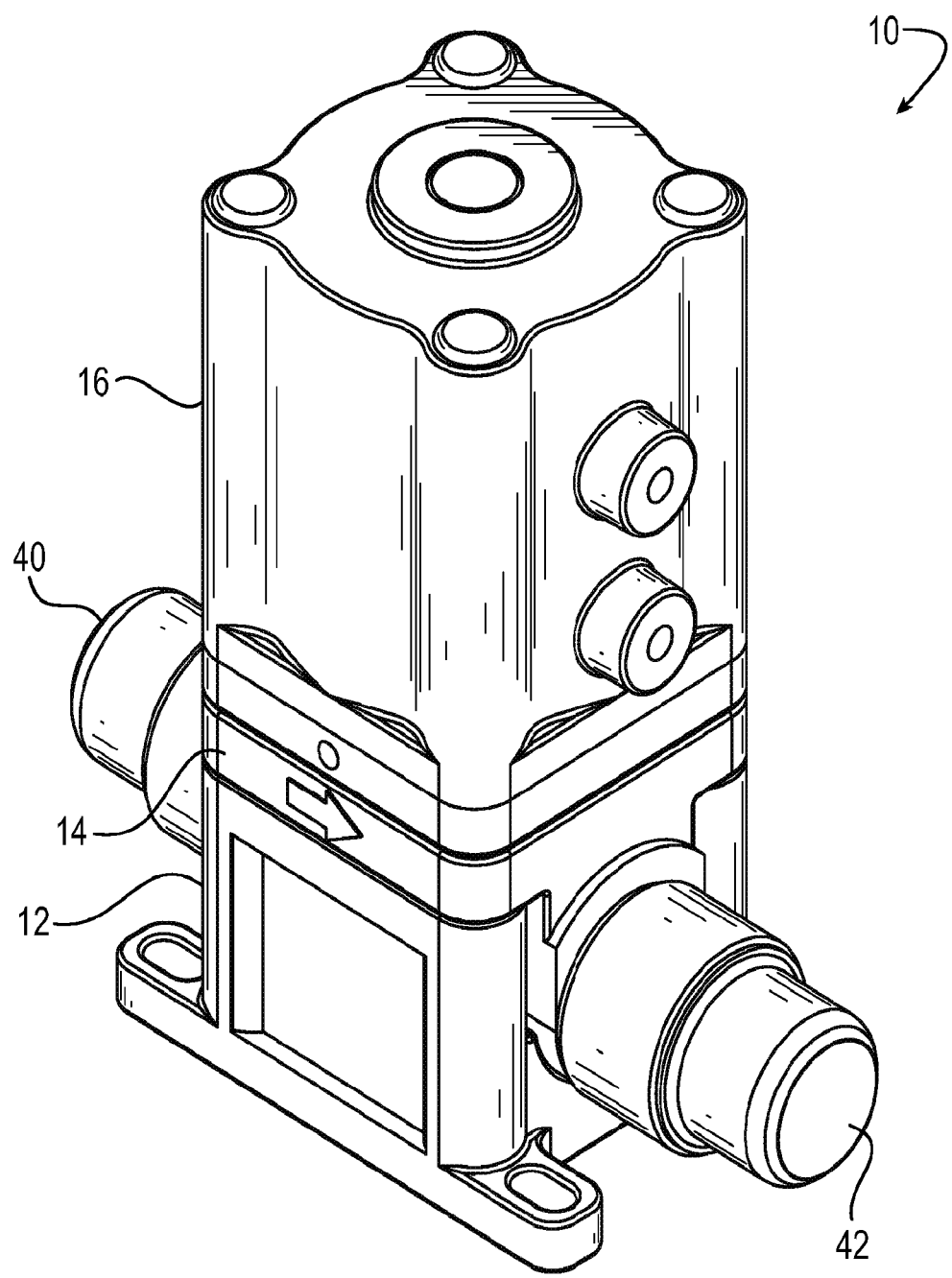
FIG. 1 is a schematic diagram that depicts an isometric view of an exemplary high purity valve in accordance with embodiments of the present invention.

Embodiments of the present invention will now be described with reference to the drawings, wherein like reference numerals are used to refer to like elements throughout. It will be understood that the figures are not necessarily to scale.

Figure 2:
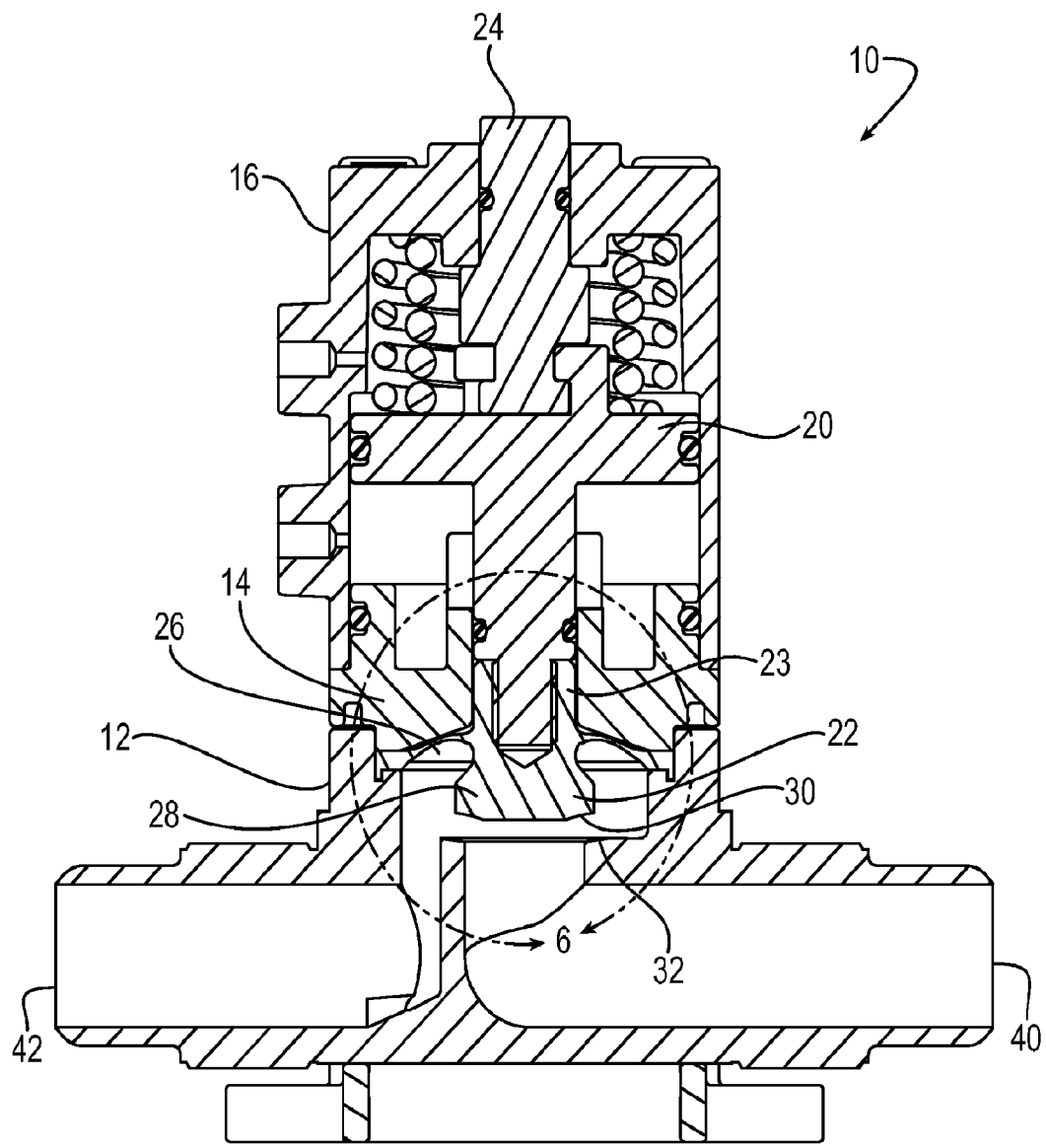
FIG. 2 is a schematic diagram that depicts a side cross-sectional view of the exemplary high purity valve of FIG. 1, with the valve in the open position.
Figure 3:
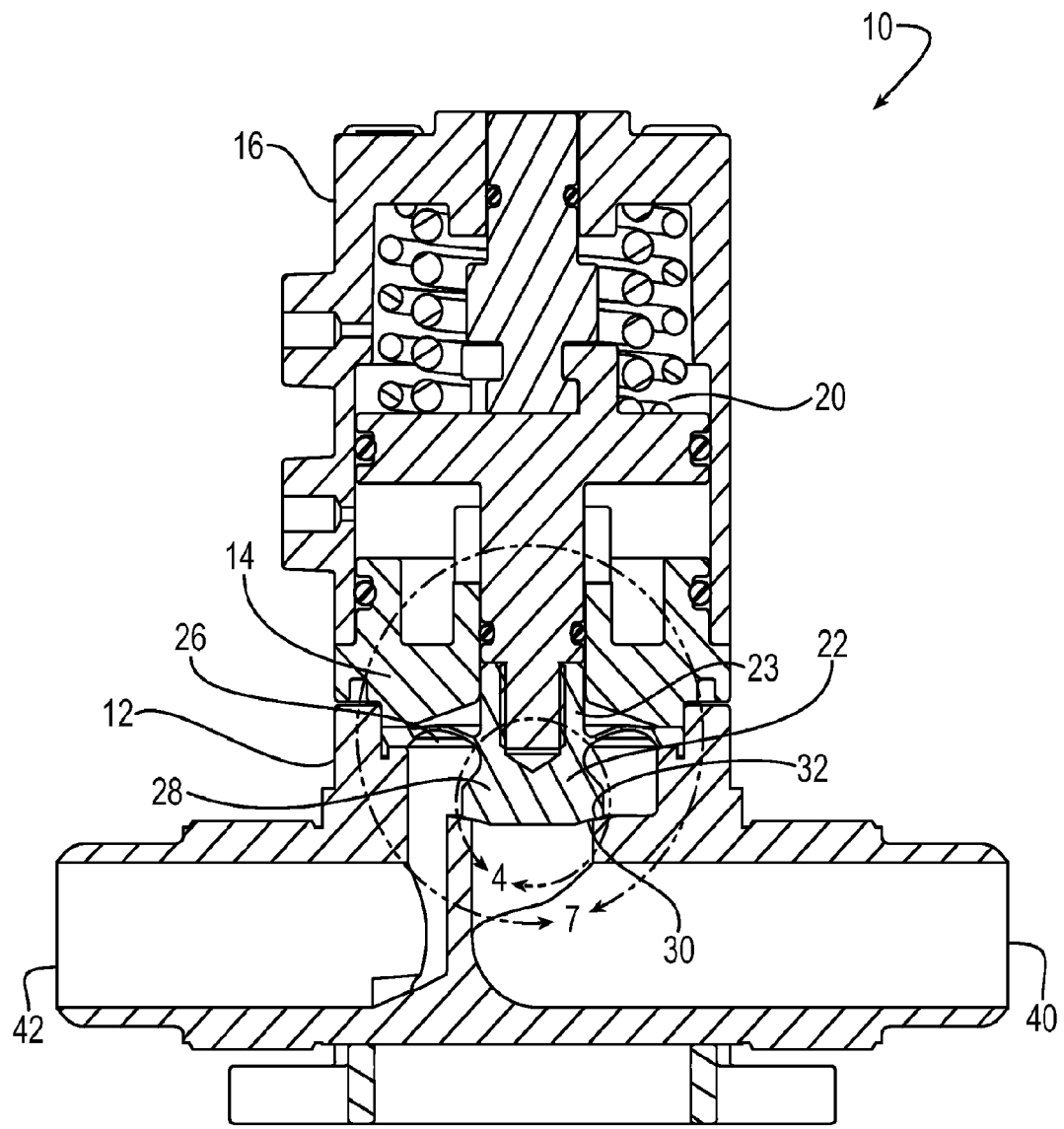
FIG. 3 is a schematic diagram that depicts a side cross-sectional view of the exemplary high purity valve of FIG. 1, with the valve in the closed position.

FIG. 1 is a schematic diagram that depicts an isometric view of an exemplary high purity valve 10 in accordance with embodiments of the present invention. FIG. 2 is a schematic diagram that depicts a side cross-sectional view of the exemplary high purity valve 10 of FIG. 1, with the valve in the open position. FIG. 3 is a schematic diagram that depicts a side cross-sectional view of the exemplary high purity valve 10 of FIG. 1, with the valve in the closed position.

Referring to FIGS. 1-3, the valve 10 includes a valve body 12, a retainer 14, and a housing 16 that are coupled to one another. The housing 16 encloses the valve body 12. Referring more specifically to the cross-sectional views of FIGS. 2-3, the housing 16 encloses a piston 20 that is coupled at one end to a diaphragm 22 and at the other end to an indicator 24. The indicator 24 can indicate whether the valve is open (indicator raised from the housing surface as seen in FIG. 2) or closed (indicator flush with the housing surface as seen in FIG. 3). The housing 16 encloses an interior portion of the valve, and the housing is coupled to the valve body 12 in a manner that seals the interior portion of the valve with an outer portion of the diaphragm. The housing 16 specifically may be coupled to the retainer 14 and the valve body 12, and the housing compresses an outer portion of the diaphragm between the valve body and the retainer.

The diaphragm 22 seals the valve body 12 to inhibit the escape of fluid from the valve. The diaphragm 22 has a central stem 23 and a radially outwardly extending web 26. One end of the central stem has a poppet 28. The other end of the central stem is coupled to the piston 20, for example, by a threaded connection or other suitable connection. The poppet 28 includes an annular surface 30 for sealing against a valve seat 32. The poppet 28 engages the valve seat 32 to seal the valve when the valve is closed as shown in FIG. 3. The valve further includes and inlet 40 and an outlet 42. When the valve is closed as seen in FIG. 3, the seal of the poppet 28 against the valve seat 32 is configured such that the inlet 40 and outlet 42 are not in fluid communication with one another. When the valve is open as seen in FIG. 2, the poppet 28 is lifted from the valve seat 32, and the inlet 40 and the outlet 42 are in fluid communication with one another.

The present invention provides for an enhanced seal of the annular surface 30 of the poppet 28 against the valve seat 32. The enhanced seal is provided by a dual point seal configuration by which the annular surface 30 of the poppet 28 contacts the valve seat 32 at least at two points.

Figure 4:
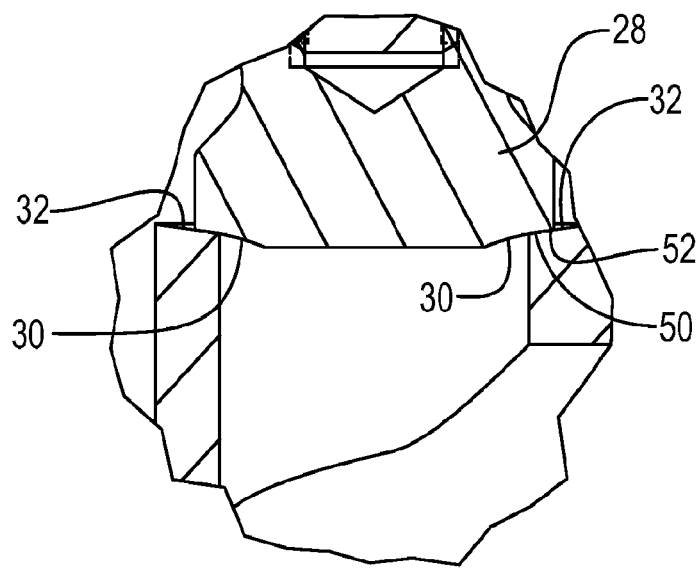
FIG. 4 is a schematic diagram depicting a first close-up cross-sectional view of a portion of the valve designated by the circle arrow "4" in FIG. 3, in the vicinity of an annular surface of a valve poppet against a valve seat, with the valve in the closed position.

FIG. 4 is a schematic diagram depicting a first close-up cross-sectional view of the portion of the valve designated by the circle arrow "4" in FIG. 3, in the vicinity of the annular surface 30 of the poppet 28 against the valve seat 32, with the valve in the closed position. In this exemplary embodiment, the annular surface 30 of the poppet 28 is a concave surface for providing a dual point seal against the valve seat 32. Due to the concave shape of the annular surface 30, the poppet 28 has a pair of dual seal points 50 and 52 that form a pair of annular seals when pressed against the valve seat 32. In particular, the annular seal point 50 forms an inner seal surface, and the outer seal point 52 forms an outer seal surface. The seal surfaces thus may be concentric with one another.

The distance between the inner seal point 50 and the outer seal point 52 may be based upon the application for which the valve is being used. For example, the dual point seal allows for variable distance between the sealing points and variable surface area between the two sealing points, which can be controlled by the upper diaphragm retainer. This allows the seal to adjust for cold flow and varying pressures, as well as adjustments as a result of extended cycling. This also allows for variable distances between the two seals for customized applications, which can incorporate more than two sealing points if desired by virtue of the concave shape. The dual point seal configuration additionally optimizes stress levels below material yield, thereby increasing the cycle life of the valve seat and diaphragm. The valve thus can perform effectively, for example, in both clear chemistry and abrasive slurry applications as are known in the art.

Figure 5:
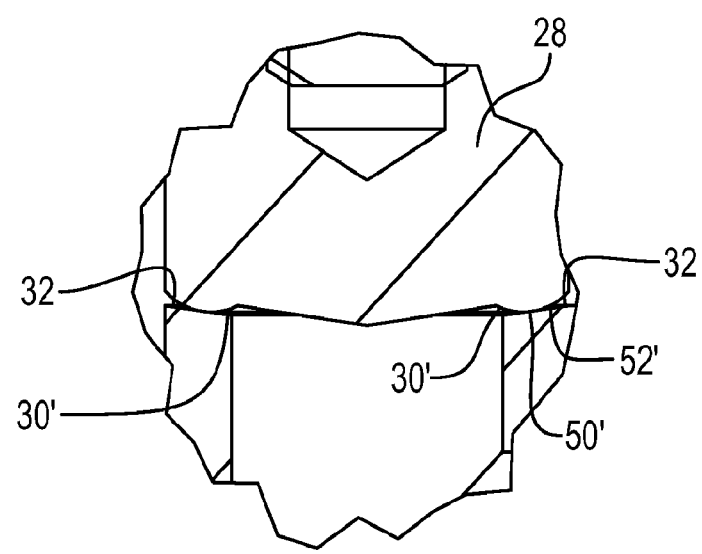
FIG. 5 is a schematic diagram depicting a second close-up cross-sectional view of a portion of the valve designated by the circle arrow "4" in FIG. 3, in the vicinity of an annular surface of a valve poppet against a valve seat, with the valve in the closed position.

FIG. 5 is a schematic diagram depicting a second close-up cross-sectional view of the portion of the valve designated by the circle arrow "4" in FIG. 3, in the vicinity of an annular surface 30' of the poppet 28 and valve seat 32, with the valve in the closed position. The embodiment of FIG. 5 has a similar configuration as the embodiment of FIG. 4, except the configuration of the annular surface 30' of FIG. 5 differs from that of annular surface 30 in FIG. 4.

In the embodiment of FIG. 5, the annular surface 30' of the poppet 28 is a convex surface for providing the dual point seal of the poppet 28 against the valve seat 32. Due to the convex shape of the annular surface 30', the poppet 28 has dual seal points 50' and 52' that form a pair of annular seals when pressed against the valve seat 32. In particular, the annular seal point 50' forms an inner seal surface, and the outer seal point 52' forms an outer seal surface. The seal surfaces thus may be concentric with one another. Comparing the concave dual seal points 50/52 (FIG. 4) to the convex dual seal points 50'/52', the shape difference results in different relative locations of the dual seal points. The embodiment of FIG. 5 has comparable advantages to the embodiment of FIG. 4 in that both embodiments provide an effective dual point seal.

Figure 6:
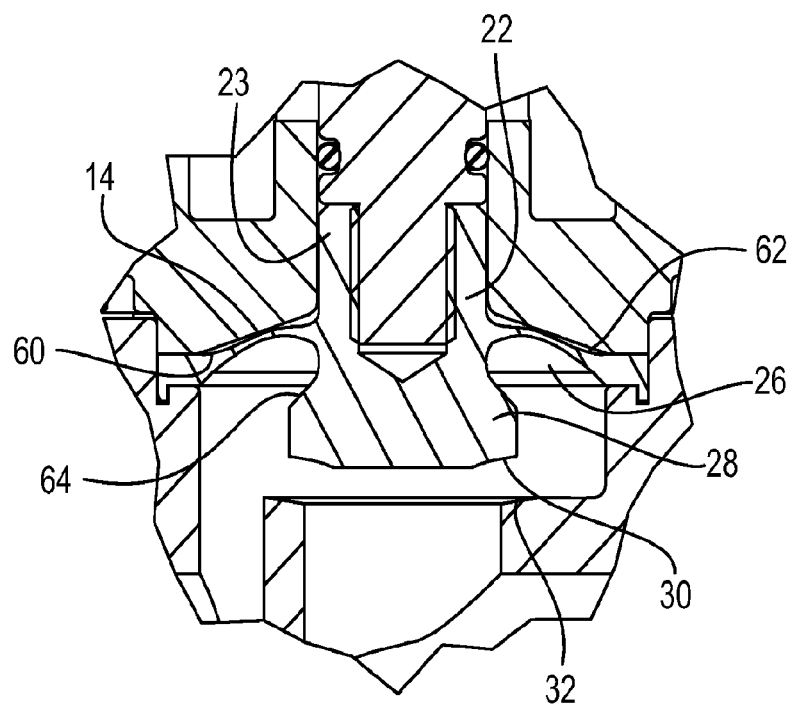
FIG. 6 is a schematic diagram depicting a close-up cross-sectional view of a portion of the valve designated by the circle arrow "6" in FIG. 2, in the vicinity of a web portion with the valve in the open position.
Figure 7:
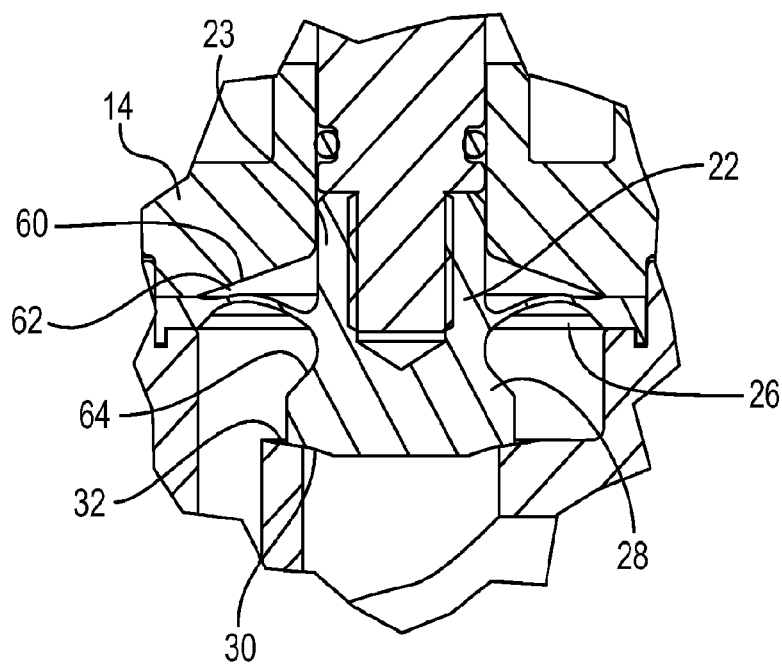
FIG. 7 is a schematic diagram depicting a close-up cross-sectional view of a portion of the valve designated by the circle arrow "7" in FIG. 3, in the vicinity of a web portion with the valve in the closed position.

Another feature of the invention is an enhanced web configuration by which the diaphragm will exhibit minimal surface stress without constraint or support from a retainer or body. FIG. 6 is a schematic diagram depicting a close-up cross-sectional view of a portion of the valve designated by the circle arrow "6" in FIG. 2, in the vicinity a web portion with the valve in the open position. FIG. 7 is a schematic diagram depicting a close-up cross-sectional view of a portion of the valve designated by the circle arrow "7" in FIG. 3, in the vicinity a web portion with the valve in the closed position.

As referenced above, the diaphragm 22 has a central stem 23 and a radially outwardly extending web 26. The web 26 may be an extended thin web. The web 26 may be flexible so as to allow the poppet 28 to move between the open and closed positions. Internal pressure of the valve 10 can cause the web 26 to bow or balloon outwards in the direction of the retainer 14 and housing 16. As seen particularly in FIGS. 6 and 7, the retainer 14 may include an end surface 60 adjacent to, but in spaced relationship to, the web 26. The end surface 60 is spaced sufficiently from the web 26 such that the web does not contact the end surface 60 when the valve is pressurized and the web is ballooned outward. This allows the web to flex and balloon to a natural position without restraint from the retainer 14, thereby minimizing surface stresses in the diaphragm and web. Such configuration improves over conventional configurations in which the web may contact the retainer as the web balloons under internal pressure, which increases the stress on the diaphragm.

As seen most readily in the valve closed position of FIG. 7, the web is contained in a space 62 between the poppet 28 and the end surface 60 of the retainer 14. As seen in the valve open position of FIG. 6, when the valve is fully actuated with maximum media pressure through the valve, the diaphragm web 26 is permitted to balloon into the space 62, but without contacting the retainer 14. As a result, when the valve is fully stroked, the retainer 14 does not touch a backside 64 of the diaphragm, thereby reducing concentrated stress levels and redistributing stress levels over the entire webbing. Due to this lack of restraint, the diaphragm web is characterized as being a "floating" web, in that the web floats within the space 62 so as not to be constrained by the retainer 14.

Figure 8:
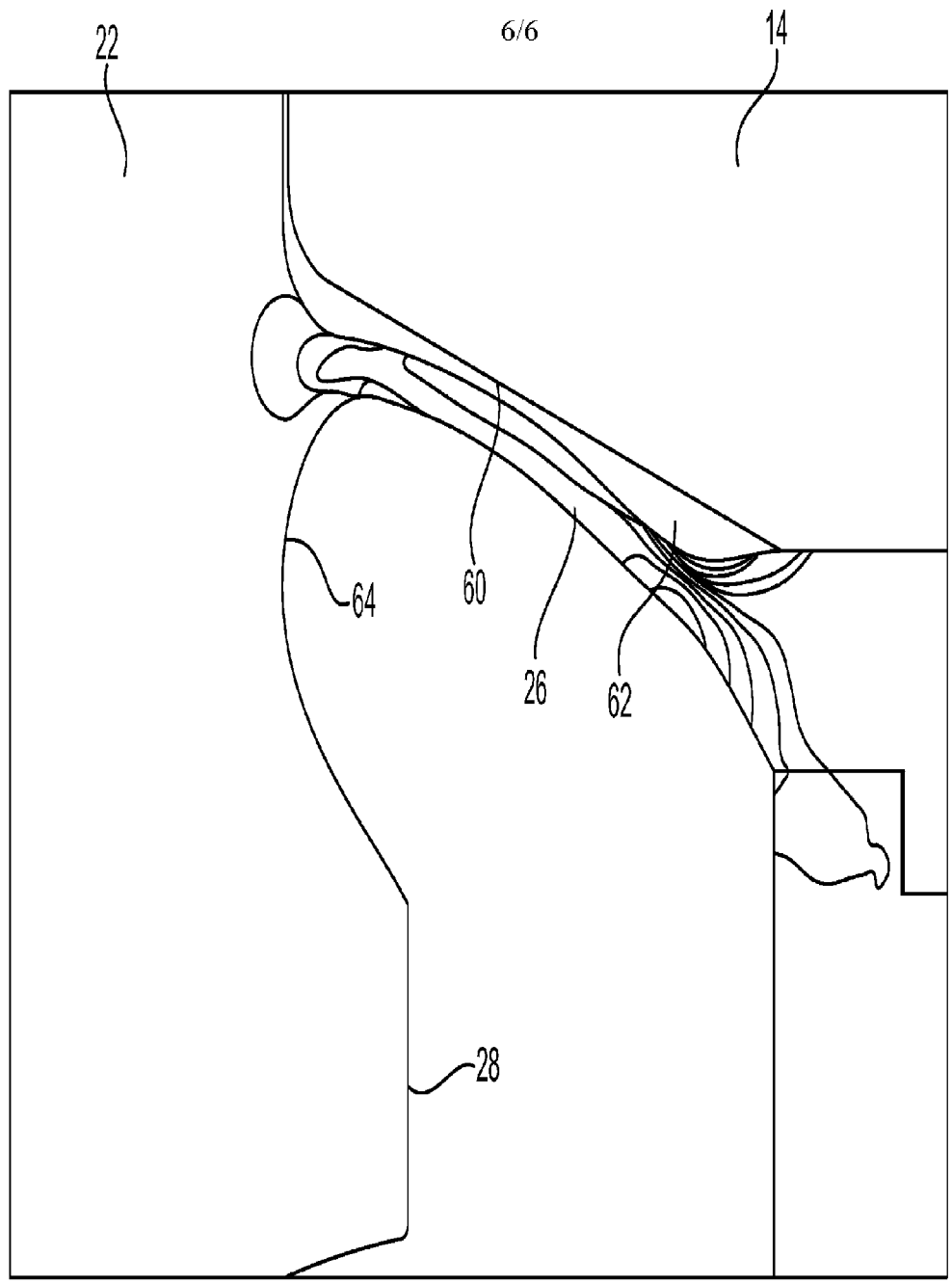
FIG. 8 is a schematic diagram that depicts a valve diaphragm and diaphragm web when the diaphragm web is subjected to internal pressure within the valve.

In this regard, FIG. 8 is a schematic diagram that depicts the valve diaphragm and diaphragm web when the web is subjected to internal pressure within the valve. FIG. 8 shows the space 62 between the web 26 and the end surface 60 of the retainer 14. Accordingly, when the valve is fully stroked, the retainer 14 does not touch the backside 64 of the diaphragm, which as referenced above, reduces concentrated stress levels and redistributes stress levels over the entire webbing.

In accordance with the above description, an aspect of the invention is a valve. In exemplary embodiments, the valve includes a valve body having an inlet and an outlet separated by a valve seat, and a diaphragm having a central stem that has a first end coupled to a piston for actuating the valve and a second end that is a poppet for engaging the valve seat to close the valve. The poppet forms a dual point seal with the valve seat having at least two points of contact between an annular surface of the poppet and the valve seat.

In an exemplary embodiment of the valve, the dual point seal includes a pair of point seals that form annular seals when the annular surface of the poppet is pressed against the valve seat.

In an exemplary embodiment of the valve, the pair of point seals includes a pair of concentric point seals between the annular surface of the poppet and the valve seat.

In an exemplary embodiment of the valve, the annular surface of the poppet is a concave surface that provides the dual point seal.

In an exemplary embodiment of the valve, annular surface of the poppet is a convex surface that provides the dual point seal.

In an exemplary embodiment of the valve, a distance between the two points of contact is a variable distance controlled by a retainer that retains the diaphragm.

In an exemplary embodiment of the valve, the valve further includes a housing enclosing an interior portion of the valve, wherein the housing is coupled to the valve body in a manner that seals the interior portion of the valve with an outer portion of the diaphragm.

In an exemplary embodiment of the valve, the housing is coupled to a retainer and the valve body, and the housing compresses an outer portion of the diaphragm between the valve body and the retainer.

In an exemplary embodiment of the valve, the valve further includes a retainer. The diaphragm further includes a web that extends radially outward from the central stem, and the retainer has a surface adjacent the web, and the surface is spaced apart from the web such that the web does not contact the surface when the valve is pressurized.

In an exemplary embodiment of the valve, the web is a flexible web that balloons outwardly in the direction of the retainer to a natural position when the valve is pressurized, thereby minimizing concentrations of stresses on the web.

In an exemplary embodiment of the valve, housing is coupled to the retainer and the valve body, and the housing compresses an outer portion of the diaphragm between the valve body and the retainer.

In exemplary embodiments of the valve, the valve includes a valve body having an inlet and an outlet separated by a valve seat; a diaphragm including a central stem that has a first end coupled to a piston for actuating the valve and a second end that has an annular surface for engaging the valve seat to close the valve, and a web that extends radially outward from the central stem; and a retainer. The retainer has a surface adjacent the web, and the surface of the retainer is spaced apart from the web such that the web does not contact the surface of the retainer when the valve is pressurized.

In an exemplary embodiment of the valve, the web is a flexible web that balloons outwardly in the direction of the retainer to a natural position when the valve is pressurized, thereby minimizing concentrations of stresses on the web.

In an exemplary embodiment of the valve, the valve further includes a housing enclosing an interior portion of the valve, wherein the housing is coupled to the valve body in a manner that seals the interior portion of the valve with an outer portion of the diaphragm.

In an exemplary embodiment of the valve, the housing is coupled to the retainer and the valve body, and the housing compresses an outer portion of the diaphragm between the valve body and the retainer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve comprising:
    a valve body having an inlet and an outlet separated by a valve seat; and
    a diaphragm comprising a central stem that has a first end coupled to a piston for actuating the valve, and a second end that comprises a poppet for engaging the valve seat to close the valve;
    wherein the poppet forms a dual point seal with the valve seat having at least two points of contact between an annular surface of the poppet and the valve seat, wherein the annular surface of the poppet is a concave surface that provides the dual point seal, wherein the concave surface has a first end located on the valve seat and a second end located off of the valve seat such that the concave surface has a first portion that is engageable with the valve seat and a second portion adjacent the first portion that does not engage the valve seat when the valve is closed, wherein the two points of contact are arranged along the first portion of the concave surface such that at least one of the two points of contact is located between the first end and the second end.

2. The valve of claim 1, wherein the dual point seal comprises a pair of point seals that form annular seals when the annular surface of the poppet is pressed against the valve seat.

3. The valve of claim 2, wherein the pair of point seals comprises a pair of concentric point seals between the annular surface of the poppet and the valve seat.

4. The valve of claim 1, further comprising a housing enclosing an interior portion of the valve, wherein the housing is coupled to the valve body in a manner that seals the interior portion of the valve with an outer portion of the diaphragm.

5. The valve claim 4, wherein the housing is coupled to a retainer, and the housing compresses the outer portion of the diaphragm between the valve body and the retainer.

6. The valve of claim 1, further comprising a retainer, wherein:
    the diaphragm further comprises a web that extends radially outward from the central stem; and
    the retainer has a surface adjacent the web, and the surface is spaced apart from the web such that the web does not contact the surface when the valve is in a fully open position.

7. The valve of claim 6, wherein the web is a flexible web that balloons outwardly in the direction of the retainer.

8. The valve of claim 6, further comprising a housing enclosing an interior portion of the valve, wherein the housing is coupled to the valve body in a manner that seals the interior portion of the valve with an outer portion of the diaphragm.

9. The valve of claim 8, wherein the housing is coupled to the retainer, and the housing compresses the outer portion of the diaphragm between the valve body and the retainer.

* * * * *